United States Patent
Slade

(10) Patent No.: US 9,826,096 B1
(45) Date of Patent: Nov. 21, 2017

(54) VISUAL INTERFACES FOR TELEPHONE CALLS

(71) Applicant: 8x8, Inc., San Jose, CA (US)

(72) Inventor: Scott Slade, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 17 days.

(21) Appl. No.: 14/956,044

(22) Filed: Dec. 1, 2015

(51) Int. Cl.
H04M 3/42 (2006.01)
H04M 3/54 (2006.01)
H04W 4/16 (2009.01)
H04M 1/725 (2006.01)

(52) U.S. Cl.
CPC ....... *H04M 3/546* (2013.01); *H04M 1/72583* (2013.01); *H04M 3/42102* (2013.01); *H04M 3/42374* (2013.01); *H04W 4/16* (2013.01)

(58) Field of Classification Search
CPC ......... H04W 4/16; H04W 40/02; H04W 4/22; H04W 48/18; H04W 76/022; H04W 4/021; H04L 45/22; H04L 67/306; H04L 47/122; H04L 47/125; H04L 47/2416; H04L 51/20; H04L 65/1046; H04L 65/1096; H04L 43/10
USPC ............... 455/417, 404.2, 432.1, 445, 456.1; 370/352, 356, 328, 338; 379/211.02, 379/212.01, 265.02, 88.01
See application file for complete search history.

(56) References Cited

U.S. PATENT DOCUMENTS

| | | | |
|---|---|---|---|
| 4,745,564 A | 5/1988 | Tennes et al. | |
| 5,884,032 A | 3/1999 | Bateman et al. | |
| 5,974,123 A | 10/1999 | Nakayama et al. | |
| 5,974,135 A | 10/1999 | Breneman et al. | |
| 6,085,231 A | 7/2000 | Agraharam et al. | |
| 6,188,761 B1 | 2/2001 | Dickerman et al. | |
| 6,198,383 B1 | 3/2001 | Sekura et al. | |
| 6,219,648 B1 | 4/2001 | Jones et al. | |
| 6,272,216 B1 | 8/2001 | Vaios | |
| 6,341,160 B2 | 1/2002 | Tverskoy et al. | |
| 6,347,139 B1 | 2/2002 | Fisher et al. | |
| 6,353,446 B1 | 3/2002 | Vaughn et al. | |
| 6,356,632 B1 | 3/2002 | Foster et al. | |
| 6,377,944 B1 | 4/2002 | Busey et al. | |
| 6,381,640 B1 | 4/2002 | Beck et al. | |
| 6,516,055 B1 | 2/2003 | Bedeski et al. | |
| 6,604,650 B2 | 8/2003 | Sagar | |
| 6,697,458 B1 | 2/2004 | Kunjibettu | |

(Continued)

FOREIGN PATENT DOCUMENTS

WO 2008089522 A1 7/2008

OTHER PUBLICATIONS

Gerry Blackwell, "Jajah: Free VoIP with a Twist," www.voipplanet.com (Oct. 5, 2006).

(Continued)

*Primary Examiner* — Fred Casca
(74) *Attorney, Agent, or Firm* — Crawford Maunu PLLC

(57) ABSTRACT

Incoming calls are received from audio capable devices. A call processing server receives an incoming call from an audio-capable device to a destination number, and detects availability for an ancillary source device linked to the audio-capable device. A set of data is provided to the ancillary source device. The set of data specifies graphical menu options for functions supported by the call processing server. The ancillary source device provides an indication of a selection of one of the graphical menu options. In response to the indication, a call transfer for the incoming call is implemented.

15 Claims, 5 Drawing Sheets

(56) References Cited

U.S. PATENT DOCUMENTS

| | | |
|---|---|---|
| 6,782,080 B2 | 8/2004 | Leivo et al. |
| 6,819,247 B2 | 11/2004 | Birnbach et al. |
| 6,829,331 B2 | 12/2004 | Cullis |
| 6,865,268 B1 | 3/2005 | Matthews et al. |
| 7,164,755 B1 | 1/2007 | Yokoyama |
| 7,269,476 B2 | 9/2007 | Ratnakar |
| 7,379,421 B1 | 5/2008 | Gao et al. |
| 7,408,843 B2 | 8/2008 | Brandon |
| 7,647,041 B2 | 1/2010 | Gonsalves et al. |
| 7,684,549 B2 | 3/2010 | Ying et al. |
| 8,300,634 B2 | 10/2012 | Narayanaswamy |
| 8,411,829 B2 | 4/2013 | Logan et al. |
| 8,995,646 B2 | 3/2015 | Hollander et al. |
| 9,008,288 B2 | 4/2015 | Hollander et al. |
| 2002/0085686 A1 | 7/2002 | Cullis |
| 2003/0048882 A1 | 3/2003 | Smith |
| 2003/0112938 A1 | 6/2003 | Kanakubo et al. |
| 2004/0013245 A1 | 1/2004 | Yokoyama |
| 2005/0185772 A1 | 8/2005 | Chen et al. |
| 2007/0280439 A1 | 12/2007 | Prywes |
| 2007/0286356 A1 | 12/2007 | Goel et al. |
| 2008/0118041 A1 | 5/2008 | Finogenov |
| 2008/0261564 A1 | 10/2008 | Logan |
| 2009/0221265 A1 | 9/2009 | Liu et al. |
| 2010/0088290 A1 | 4/2010 | Telschow et al. |
| 2010/0091957 A1 | 4/2010 | Ying et al. |
| 2010/0197288 A1 | 8/2010 | Camilleri et al. |

OTHER PUBLICATIONS

Jeff Goldman, "TalkPlus: a PBX for Mobil Phones," www.voip-planet.com (Aug. 16, 2007).

Jacada, Inc. "Vivual IVR by Jacada," www.visual-ivr.com/how-does-it-work (© 2014).

Jacada, Inc. "Product Overview—Jacada Support," https//.jacada.zendesk.com/hc/en-us/articles/202127826-Product-Overview (printed Nov. 23, 2015).

| Menu Option | Menu 1 | Menu 2 | ... | Selection Criteria | Menu Action | Prerequisites |
|---|---|---|---|---|---|---|
| A | Default | No | ... | 000101101110 | Authenticate and Menu 2 | None |
| B | Default | No | ... | 000101101110 | Menu 3 | None |
| C | Dynamic | Default | ... | 111001001111 | Call Jane Doe | None |
| D | Dynamic | Dynamic | ... | 101000110000 | Provide Account Data | None |
| E | No | Dynamic | ... | 000001100000 | Voicemail | Authentication |
| ... | ... | ... | ... | ... | ... | ... |

FIG. 4

VISUAL INTERFACES FOR TELEPHONE CALLS

OVERVIEW

A private branch exchange (PBX) routes calls between a service provider network (e.g., a cellular network or a public standard telephone network (PSTN)) and a plurality of end-users having respective telephone extensions in a private telecommunication network. One type of PBX, known as an Internet Protocol PBX (iPBX), routes calls between a service provider network and a plurality of Voice over Internet Protocol (VoIP)-enabled devices on an IP network using VoIP, in which each device is assigned a respective telephone extension.

iPBXes can be used with auto-attendant services, which can provide call answering functions and reduce (or eliminate) the need to retain a live person as a receptionist. Callers can hear a custom business greeting along with options for routing their calls. An auto-attendant service can provide automated directories, allow for direct inward dialing, have different modes of operation (e.g., depending on business hours), as well as other functions.

SUMMARY

Various embodiments of the present disclosure are directed toward a method for processing incoming calls from audio-capable devices. The method is carried out at a call processing server and includes receiving, at the call processing server, an incoming call from an audio-capable device and to a destination number; detecting availability for an ancillary source device linked to the audio-capable device; providing, to the ancillary source device, a set of data that specifies graphical menu options for functions supported by the call processing server; receiving, from the ancillary source device, an indication of a selection of one of the graphical menu options; and implementing, in response to the indication, a call transfer for the incoming call.

Certain embodiments of the present disclosure are directed toward a method for processing incoming calls using devices that have graphical display capacities. The method includes receiving, at a call processing server, incoming phone calls from callers operating telephone capable devices; sending, to a call data processing server, call event messages corresponding to phone calls routed by the call processing server; receiving, from the call data processing server, call summary metrics generated from the call event messages; modifying, in response to the call summary metrics, a set of data that specifies graphical menu options for functions supported by the call processing server; providing, to a particular caller of an incoming call, the set of data that specifies graphical menu options; receiving an indication of a selection of one of the graphical menu options; and implementing, in response to the indication, a call transfer for the particular incoming call.

Consistent with some embodiments of the present disclosure, a system includes a call processing server with at least one processing circuit and a memory circuit that are configured to: receive, at the call processing server, an incoming call from an audio-capable device to a destination number; detect availability for an ancillary source device linked to the audio-capable device; provide, to the ancillary source device, a set of data that specifies graphical menu options for functions supported by the call processing server; receive, from the ancillary source device, an indication of a selection of one of the graphical menu options; and implement, in response to the indication, a call transfer for the incoming call.

The above discussion/summary is not intended to describe each embodiment or every implementation of the present disclosure. The figures and detailed description that follow also exemplify various embodiments.

BRIEF DESCRIPTION OF THE FIGURES

The disclosure may be more completely understood in consideration of the following detailed description of various embodiments of the disclosure, in connection with the accompanying drawings in which:

FIG. 4 depicts a table that includes menu options and associated data useful for creating a menu tree, consistent with embodiments of the present disclosure.

Figure 1:
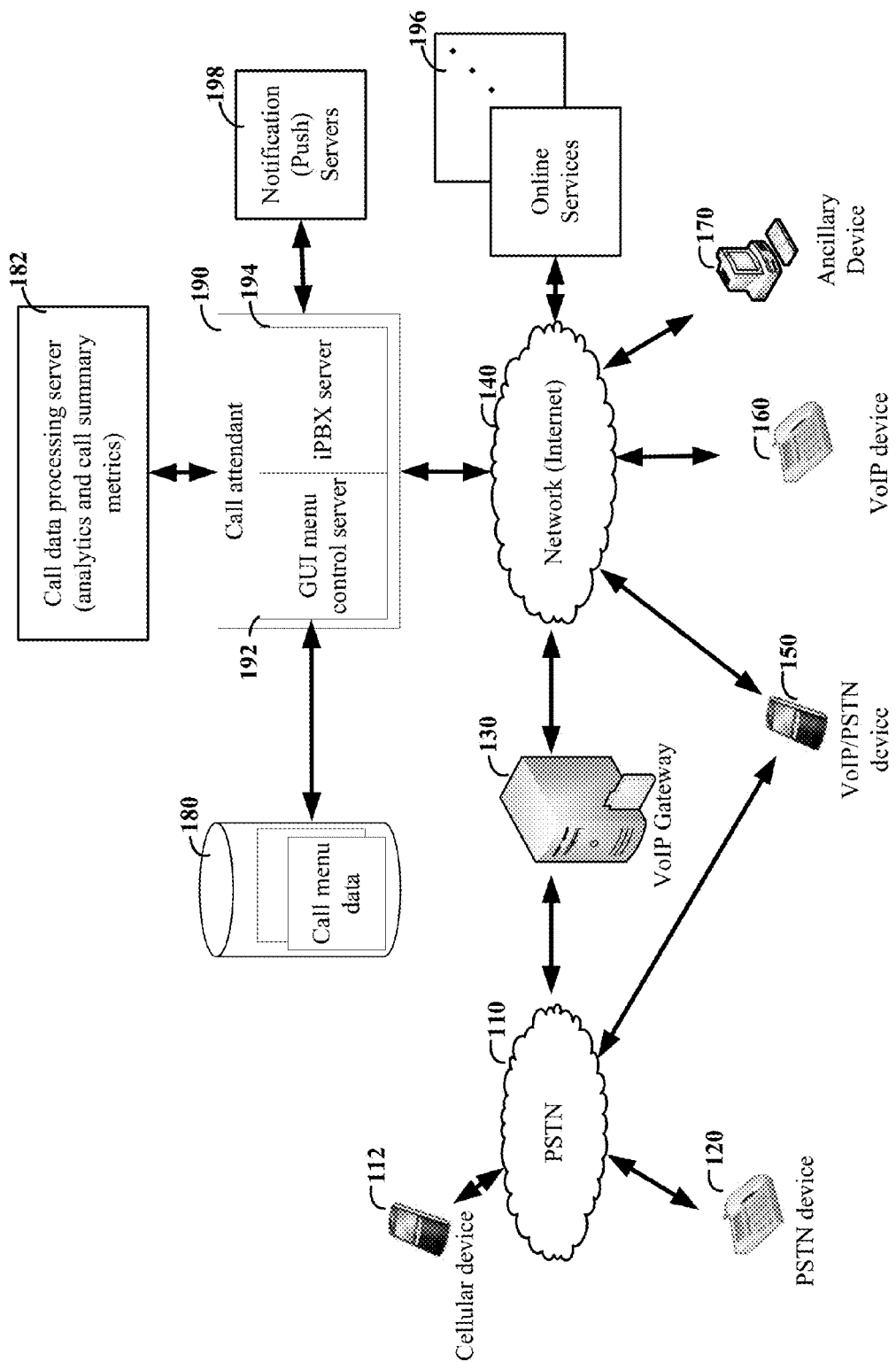
FIG. 1 depicts a block diagram for a system that is configured to provide dynamically adjustable menu options to callers, consistent with embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods relating to intelligent and dynamic call menus.

Various embodiments of the present disclosure are directed toward a system that is configured to provide graphical selectable options that form a menu to individuals making phone calls into the system. According to embodiments, dynamic adjustments can be made to the menu options based upon a variety of inputs and analyses. For instance, the system can be configured to collect and analyze call data metrics from calls into the system in order to determine how to modify the menu options for particular callers.

Consistent with embodiments, the system can be configured to receive a telephone call and determine that a device associated with the caller has the capability of receiving and using a graphical menu. This might include detecting that the caller uses a smart phone that is Internet-capable to make the original call, or that the caller is also presently using a secondary device that is Internet-capable. In some embodiments, other capabilities of the device, such as display capabilities, can also be determined and used. For ease of discussion, such determinations are referred to in the context of whether a device is Internet-capable, however, the determinations can also be made based upon other capabilities, such as display resolution and size, input capabilities (e.g., touch screen, keyboard, mouse), and processing capabilities. With the graphical menu serving as a guide, the audio call can be directed through the phone system to provide appropriate audio information and to transfer the audio call to the appropriate party. For example, the graphical menu can supplement, or take the place of, audio prompts of an auto attendant. As discussed herein, the graphical menu can also be configured to receive additional information from the caller (e.g., identification or authentication information, account numbers, or credit card numbers), which can be easier than using a telephone touchpad or voice recognition.

A number of embodiments of the present disclosure are directed toward the identification and use of a secondary device for displaying the menu options while the audio portion of the call is continued on a primary audio capable device. For instance, a caller may use a landline telephone, cellular phone, VoIP phone, or similar audio-capable phone device to call into the system. The system can then correlate the caller to another device that can be used to present graphical menu options. The caller can then use the secondary device to view and select the displayed options. The system can advance the audio call and the graphical menu options based upon the selection, e.g., by ultimately transferring the call to an appropriate party.

As discussed herein, various embodiments are directed toward the use of dynamic menu options that can be identified and displayed to a caller depending upon the results of data analytics relative to the call. In this manner, the customization of the menu can be caller specific, or more general. As an example, a data analytics server can be configured to analyze factors such as call trends for recent calls and adjust the menu options for all (or a subset) of the calls to account for the trends. More specifically, the data analytics server may detect that there is an uptick in a particular pattern/sequence of menu traversals by callers. For example, a service provider (e.g., utility provider) might be experiencing widespread outages, which results in a short term increase in callers traversing the menu to get to an option that provides a report on known service outages. The default menu might require that the individual traverse several menu options before being provided with the relevant information. The system could detect this trend and modify the menu to present the final option for reporting the service outages immediately, or at least earlier in the sequence. In certain embodiments, the system can be configured to respond to such situations by displaying relevant type of information visually so as to avoid the need to select and traverse the menu options.

As used herein, the term server refers to a hardware computer device that includes at least one processing circuit and a storage circuit that stores instructions, which provide specialized configuration of the hardware computer for the performance of functions associated with the particular server. In some instances, a hardware computer device can be specially configured to provide functions discussed in the context of more than one server. Particular instances allow for servers to be implemented on virtual machines, where the virtual machines interface between the virtual environment of the server and the hardware computer device.

According to certain embodiments of the present disclosure, the system can be configured to determine probabilistic distribution for selections by a caller based upon analysis of call summary metrics and other information. For example, the system can use the call summary metrics, and other information, to create a probability of selection for various menu options within the menu tree. The system can then modify and provide a graphical display by adjusting menu options, providing additional information (e.g., relevant advertisements, status information, and combinations thereof), and other modifications discussed herein. In some instances, the system can modify the graphical display to include options that exceed a set threshold probability level. This can be helpful for increasing the efficiency of the call processing system, including reducing call times and improving the user experience for callers.

FIG. 1 depicts a block diagram for a system that is configured to provide dynamically adjustable menu options to callers, consistent with embodiments of the present disclosure. The system can include a call processing server that is configured to function as one or more automated call attendants 190. According to various embodiments, the call attendant 190 can be configured to operate as an iPBX server 194 that includes a graphical user interface (GUI) menu control server 192. For instance, one or more computer processor circuits can be configured to process incoming calls and connect them to users serviced by the iPBX server 194. As a non-limiting example, the iPBX server 194 might be used by a call center, a business or another entity that can benefit from the use of a call attendant.

The call attendant 190 can be configured to receive phone calls from a number of different sources. For example, the calls can originate from landline public switched telephone network (PSTN) devices 120 or cellular devices 112. For such devices, the call may traverse a PSTN 110. If the call attendant 190 is part of an Internet-based PBX, a VoIP gateway 130 can serve as an interface between the PSTN 110 and the Internet 140. It is noted that various wide-area networks (WANs) and local area networks (LANs) can be used to process VoIP calls from the VoIP gateway. These WANs and LANs can be public or private and they can be used with or in place of the global Internet.

Call attendant 190 can also receive calls directly from VoIP devices 150 and 160. In some embodiments, a device can be both VoIP and PSTN capable, as shown by device 150. For example, some smart phones can make calls using either traditional cellular networks or over VoIP (e.g., using a Wi-Fi connection or through Internet access that is provided by a cellular telephone service provider).

In response to a received call, the call attendant 190 can provide auto attendant responses to the callers. According to various embodiments, the call menu data for the menu options can be stored in one or more databases 180. These responses can include selectable menu options that are conveyed to the callers verbally (e.g., "press 1 for sales"). According to various embodiments, the call attendant 190 can also be configured to provide menu options as part of a visual interface. The hardware device can be configured to display the menu by way of variety of different software applications (or just "applications"). For example, the menu options can be displayed within a web-browser that the caller can be directed to by first providing an active link that points to a web server. When a user selects the active link, the web-browser is redirected to the appropriate webpage. The web server can then provide the menu options as part of a webpage that is displayed within the web-browser. In some embodiments, a specialized application can be used to display the menu options.

The menu options can be viewed and then selected by the caller. In certain embodiments, the caller can be provided with both audio (over the telephone call) prompts and visual selectable options (over an IP connection). The caller can then use either numerical selections on the telephone device (e.g., using a keypad to generate touch-tone signals) or select the visual options (e.g., using a touch screen, mouse or similar selection control). The call attendant 190 can be configured to respond to either (or both) selection methods appropriately (e.g., by advancing through additional menus, providing relevant information, or transferring the call). In certain embodiments, the audio prompts and visual options can match up. Thus, the caller will hear the exact same options that are being displayed. Various embodiments allow for different selections to be presented in each of the different formats, such as by providing them in a different order, using at least some different selections in each with or without some overlap in selections between the menus.

According to various embodiments of the present disclosure, the call attendant can modify the data menus based upon data received from one or more call data processing servers 182 (or just "analytic server 182"). The analytic server 182 can be configured to receive call event messages from the iPBX server 194 as well as from other PBX servers. The call event messages can then be used to generate call summary metrics that can be used to determine how to modify the visual menu. For instance, the GUI menu control server can be configured to identify when certain thresholds are met and to select, in response to a threshold being met, add and remove selection options from the menu as may be appropriate. As an example, the call summary metrics might providing information relating to call durations, call wait times, call volume, call transfer sequences, and other information. Moreover, information other than call summary metrics can also be used to determine how to modify the menus. For instance, the system can use profile data for a caller, which can be selected based upon identification (e.g., as might be provided by the caller during the call or through caller ID).

Consistent with various embodiments, the call attendant 190 can be configured to correlate a caller with one or more ancillary/secondary source devices, the secondary devices being different from the device used to initiate the call. For instance, a caller might use a PSTN device 120 (or any telephone capable device) to call into the call attendant, while the secondary device could be a home computer 170 or a smart phone or tablet 150. The caller can then listen to audio over the PSTN device 120, while reading and making selections using the secondary device. According to some embodiments, the secondary devices can be identified from the profile of the caller, which can be stored in a database 180. For example, the profile may include a list of preferred secondary devices, their capabilities, and connection information. In some instances, the call attendant 190 can include a caller interface that allows the caller to setup and adjust the profile. In other instances, the call attendant 190 can be configured to create and maintain the profile without input from the caller.

According to embodiments, the call attendant can transfer the call to a secondary device. For instance, the secondary device may be capable of handling VoIP calls. The GUI menu can include options to initiate such a transfer. For instance, the call attendant 190 can be configured to initiate an outbound call to the secondary device. Upon connection, the audio call with the originating device can be disconnected. In some instances, a connection can also be established with another party and connected with the outbound call. For example, upon selection of an individual from a directory and a selection to transfer the call to the secondary/ ancillary source device, the call attendant 190 can generate multiple call legs by initiating a call to the secondary source device and a call to a device for the individual from the directory. Once the calls are established with each of the devices, the call attendant 190 can connect each of the different call legs to create a connection between the devices on each end of the legs.

Moreover, the secondary device may have video capabilities, allowing for a video conference to be initiated with another party that was selected using the menu options. The audio for the video conference can be provided directly to the secondary device or using the existing audio call connection with the originating device.

Consistent with certain embodiments, the call attendant 190 can use push notifications to the secondary devices. For example, APIs can be used to deliver push notifications to iOS or Android devices. This can be accomplished using one or more notification servers 198, which can be configured to store and use information about how to reach the secondary devices for the purpose of providing the notifications.

According to various embodiments, the call attendant 190 can identify candidate secondary devices based upon the caller's status relative to one or more online services, as provided by corresponding online service servers 196. For instance, a caller profile can identify one or more identities associated with the caller and with an online service. This might include, for example, a social networking service. The call attendant 190 can query the appropriate online service server 196 to determine if the identity is currently active (e.g., if the user is logged in or had recent activity). If so, the call attendant 190 can either receive information about the secondary device from which the activity originated, or simply send a notification using the online service server 196. As a non-limiting example, a caller could call into the call attendant 190 and provide account information that identifies the caller. The caller profile could be consulted to identify a social networking site (e.g., FACEBOOK) and a user ID for the same site. The call attendant 190 could check with the appropriate online service server 196 to determine whether or not the caller is using the social networking site. In response to receiving an indication that the user ID for the site is active, the call attendant 190 can send a notification to the caller indicating the possibility of using a visual menu in conjunction with the call. The notification might, for example, include a link to a secure website that is uniquely accessible to the caller. Various embodiments allow for the integration of the menu options into the social networking site functionality.

Figure 2:
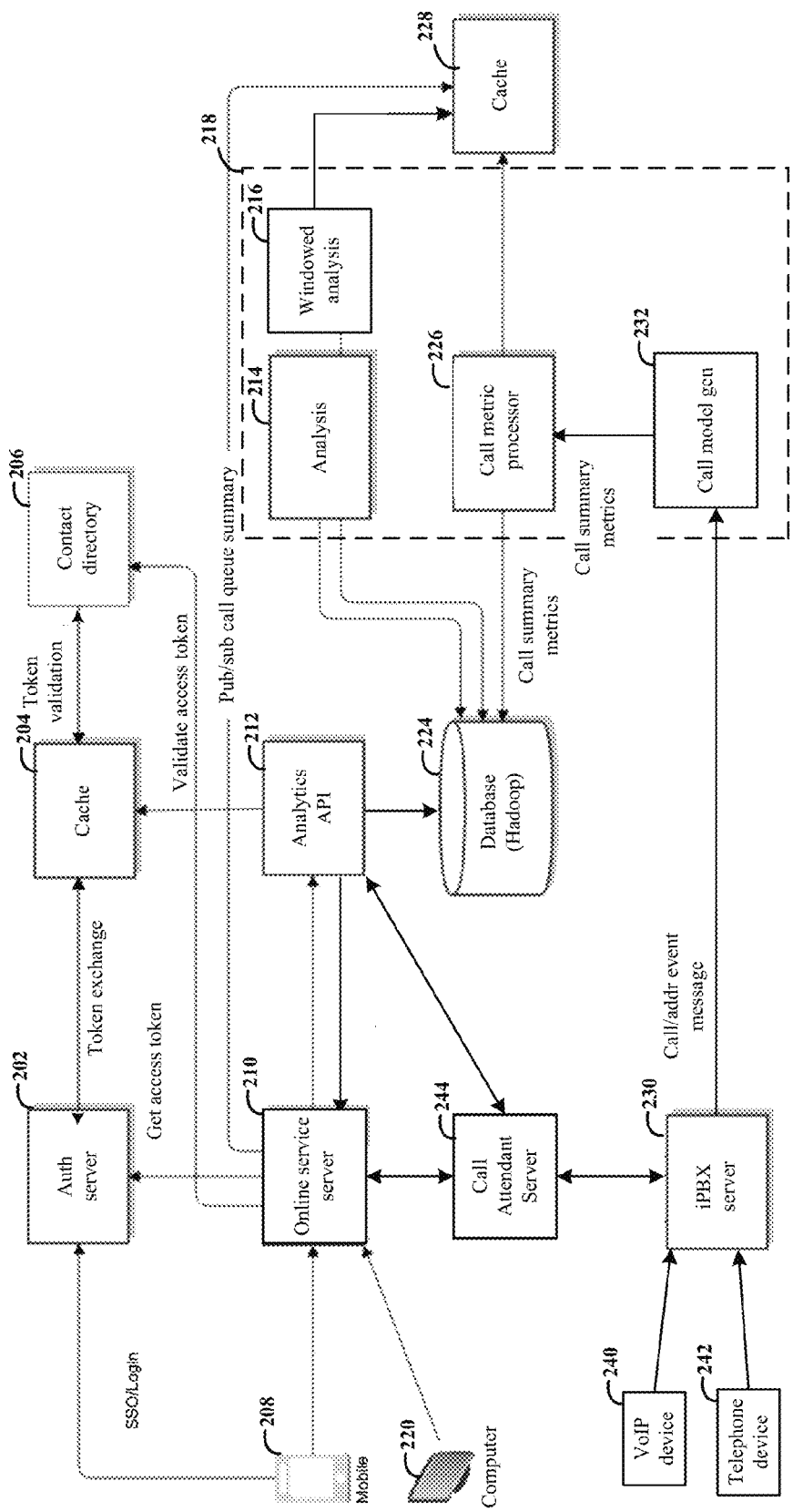
FIG. 2 shows a system for generating and using call summary metrics with an auto attendant, consistent with embodiments of the present disclosure.

FIG. 2 shows a system for generating and using call summary metrics with an auto attendant, consistent with embodiments of the present disclosure. The system includes an iPBX server 230 and a call data processing circuit 218. The iPBX server 230 can be configured to route calls to and from telephone (VoIP) devices 240 and 242 for a plurality of end-users having respective extensions.

Consistent with various embodiments, the call data processing circuit 218 can include a call model generation circuit 232 that is configured to receive call event messages from the iPBX server 230. The call event messages may be communicated, for example, as computer-telephony-integration (CTI) messages. The call model generation circuit 232 generates call models based on the call event messages. Call metric processor 226 generates call summary metrics from the generated call models.

According to embodiments, the call metric processor 226 can be configured to store the generated call summary metrics in a database 224. The database 224 can be configured to retain the call summary metrics for a set period of time, until deleted by an authorized user, or for other reasons. In various embodiments, the call metric processor 226 can also be configured to store call summary metrics for a limited window of time in a cache circuit 228. This can help to reduce the amount of data that is communicated by limiting the communicated data to data occurring within the specified window of time. In some implementations, the call summary metrics in the cache circuit 228 may be updated as the call summary metrics are generated or expired. In some other implementations, call summary metrics may be updated at the beginning of each time window. The call data processing circuit 218 can include a first analysis circuit 214 that is configured to perform analysis on call metric data stored in the database. The call data processing circuit 218 also includes a second analysis circuit 216 that is configured to perform analysis on the windowed call metric data stored in the cache circuit 228. Analytics data generated by the analysis circuits 214 and 216 may be stored in the database 224 for access by various applications.

According to embodiments, the system can interface with one or more online service servers 210, which may provide various applications to end-user devices 208 and 220. In some instances, the applications can even utilize the call summary metric data stored in the database 224. As an example, a dashboard application server may provide a manager application to facilitate assessment of performance/efficiency of end-users in a call center, based on analysis of the call summary metrics stored in the database 224. As another example, the dashboard application servers 210 may provide a switchboard interface (not shown) for a receptionist to direct the routing of calls by the iPBX server 230. The dashboard application servers 210 relay call control commands and call events between the switchboard interface and the iPBX server 230. In some implementations, a switchboard interface may display statuses of end-users in a contact directory 206 for the iPBX in a graphically user interface. The states of end-users may be determined based on an analysis of call summary metrics and/or other data stored in the database 224. An end-user may access the example switchboard interface or manager applications, by directing a web-browser on a computing device (e.g., end-users devices 208 or 220) to a corresponding web server provided by the dashboard application servers 210.

The system may include various servers and circuits that provide various support services. For example, the system may include an analytics API 212 that is configured to retrieve analytics and/or call summary metrics from the database on behalf of applications provided by the online service servers 210. As another example, the system may include an authentication server 202 configured to authenticate users and permissions for various servers or applications in the system. For instance, when an end-user device 208 or 220 logs into an application provided by the online service server 210, online service server 210 may authenticate the end-user using the authentication server 202. In some implementations, the authentication server may retrieve an authentication token and/or other user data from contact directory 206 as part of the login process. In some implementations, the token or data may be temporarily cached in a cache circuit 204.

According to embodiments, a caller into the iPBX server 230 can be provided with menu options that are controlled by a call attendant server 244. As discussed herein, the call attendant server can be configured to provide data for a visual menu to the calling device (e.g., where the calling device is Internet-capable) or to a secondary device (e.g., such as a secondary device 208, 220 discovered through use of an online service server 210). The call attendant server 244 and the iPBX server 230 are depicted as separate blocks; however, it is recognized that they collectively form a call processing server. For example, the functionality of the iPBX server 230 includes the ability to present and carry out the menu options provided by the auto-attendant. In various embodiments, the iPBX server 230 can be implemented as a subpart of the call attendant server 244, similar to the iPBX server 194 as depicted in FIG. 1.

According to various embodiments the call summary metrics can be used to direct the call attendant server 244 so that it is capable of generating dynamic adjustments the GUI menu. The dynamic adjustments can be targeted to an individual caller, subsets of callers, or to all callers. For instance, the call summary metrics can be used to identify call trends (e.g., service call spikes, lengthy call service times, or an excessive amount of call transfers after initial connection to representative) on a real time basis for calls coming into the call attendant 190. Information related to an individual call into the call attendant can be correlated to the identified call trends to select adjustments to a default GUI menu. This correlation can be made based upon a consideration of a number of different aspects for each individual call. As discussed herein, the correlation can be made based upon a predictive determination as to a likely purpose of the call. At another level, and potentially at the same time as the individual-based adjustments, the adjustments could be associated with a particular subset of callers. For instance, the adjustments could be provided for all calls from a particular geographic location. It is also possible to make adjustments to the GUI menu for all calls that are received.

Figure 3:
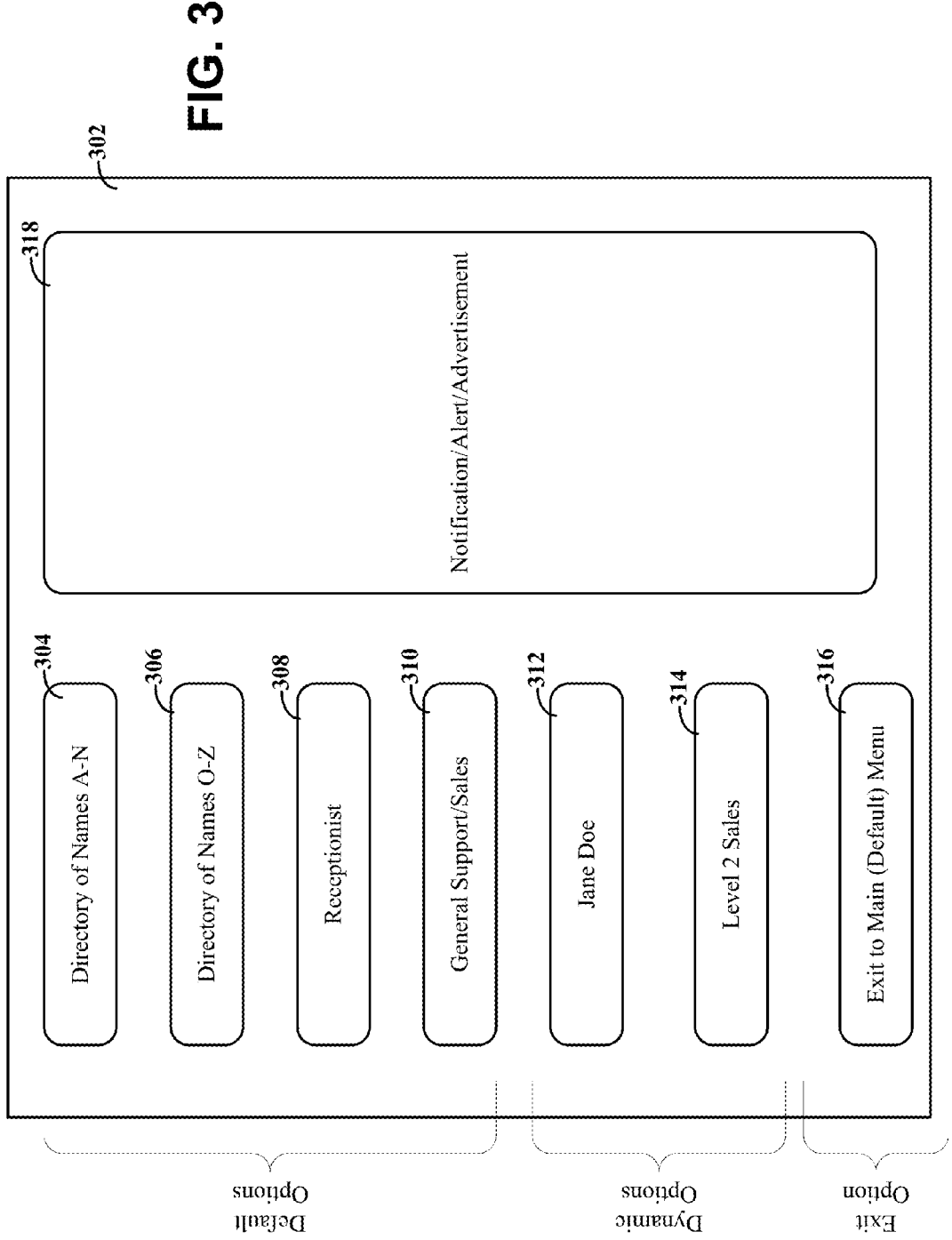
FIG. 3 depicts an example of a GUI menu, consistent with embodiments of the present disclosure.

FIG. 3 depicts an example of a GUI menu, consistent with embodiments of the present disclosure. The GUI menu 302 includes a number of selectable options 304-316. A first subset of these options are identified as default options 304-310. According to various embodiments, the default options 304-310 can be options that are not customized for the particular caller. For example, they depicted options include directories of names 304, 306, an option to select a receptionist 308, and an option to transferred to general support or sales 310. These options might be part of a default first menu that is presented to each and every caller. A second set of options 312 and 314 can include dynamically adjusted options. These options can be selected based upon call summary metrics, call history profiles, and other information. The depicted options include an option to be transferred to a specific individual, per option 312, and an option to be transferred to a higher level of a sales department, per option 314. A final option can be an exit option 316 that allows an individual to use a version of the menu that has not been customized.

The GUI menu 302 can also include one or more areas 318 for notifications, alerts, advertisements, and combinations thereof. In some instances, the information in area 318 can be customized for each call and each caller. For instance, an alert can be generated if a caller has an outstanding balance that is past due. For such an instance, the area 318 can also include an option that allows the caller to be transferred to an account specialist that can assist in the payment of the outstanding balance. In certain embodiments, the area 318 can provide video content.

According to various embodiments, the breakdown of default to dynamic options can be specified for each different menu. For example, a call attendant server can be configured to provide a series of individual menus that are linked together by way of different selectable options and other criteria. In this manner, the menus that are linked together can collectively be referred to as a menu tree. Each menu in the menu tree can be defined by a set of default options and dynamic options. The number and configuration of each can be varied based upon the particular application.

In some embodiments of the present disclosure, the dynamic options can be selected by determining the probabilities for different selection options as well as for reasons that a caller is using the auto attendant. For example, call summary metrics can be analyzed to determine that a large number of calls have recently been directed to the sales department, which might require multiple caller selections to reach the default options. The system can be configured to present an option to go directly to the sales department at the first (or any earlier) menu. Moreover, the system can be configured with additional intelligence, such as correlating such call trends with relevant additional data. This might include, for example, correlating an increase in calls with a geographic location and thereafter modifying the menu options for individuals making calls from the geographic location. As another example, the caller identity can be used in determining which dynamic options to display. For instance, the identity of a caller might indicate that the caller is an employee of the organization and the menu can be customized to show team members or voicemail options. In certain implementations, the system can be configured to collect information for an online service to improve upon the dynamic customization of the menu. For instance, the system can be configured to use information available on a social networking site to determine probabilities related to the callers most likely reason for calling.

In certain embodiments, the GUI can be used even after a call is transferred to a live person. For example, the GUI can be linked to the called individuals so that it can be used to display images and other information. This might be particularly useful for allowing a sales person to show images of different products and other information. In other instances, a technical support person might be able to show an image that explains how to carry out troubleshooting operations. Any number of different uses can be employed using this concept.

FIG. 4 depicts a table that includes menu options and associated data useful for creating a menu tree, consistent with embodiments of the present disclosure. The depicted table includes a Menu Option column that includes selectable menu options (labeled A-E for simplicity). This table can include all of the selectable options for the entire menu tree. For example and referring back to FIG. 3, menu option "A" might correspond to "Directory of Names A-N," while menu option "B" might correspond to "Directory of Names O-Z."

The second, third and fourth columns specify different menus in the menu tree. There can be as many menus as desired in the table and each menu can be defined by the particular menu options identified in the corresponding column. For example, the table shows three different designations for each option with relation to each menu, "Default," "Dynamic," and "No." The default option can indicate that the menu option is always shown for the corresponding menu. The dynamic option can indicate that the corresponding menu option can be displayed for that menu—so long as the appropriate criteria is met. The no option can indicate that the menu option cannot be displayed for that menu. For example and referring again back to FIG. 3 as a hypothetical "Menu 1," options 312 and 314 might correspond to menu options C and D in the table. It is noted that additional or different designations can be used. For instance, there could be a "Preferred" designation that specifies that an option will be displayed unless a dynamic option is identified as being sufficiently relevant.

The fifth column specifies selection criteria associated with the menu options. For simplicity, the selection criteria are indicated by a set of binary values, where each value represents a different criteria. For instance, the most significant bit might correspond to whether or not the caller is an employee of the company hosting the call auto attendant. A "1" in this bit would indicate that this is a factor to be considered in determining whether or not the option should be inserted into a particular menu for which the option is also designated as "Dynamic." Various embodiments also allow for the different criteria to be weighted relative to one another. This can be accomplished, for example, using numbers at a higher radix (e.g., higher than binary/base 2), and in some instances, negative values, which can indicate that the presence of corresponding criteria suggests that the menu option should not be used.

The sixth column specifies the action(s) that result from the selection of the option. For example, the selection might result in another menu being displayed, a request for authorization information, transfer of the call, display or audio information being provided, and combinations thereof.

The seventh column specifies prerequisites before the option can be displayed. For instance, menu option E requires that authentication of the caller be completed before the option can be displayed.

The summaries shown in the figure are merely provided as examples. Additional or fewer factors can be considered and used. Moreover, the corresponding information can be stored in formats other than traditional tables. This might include, but is not necessarily limited to, various graphical representations of the menu tree, the individual menus, the individual options, and their dependencies.

Figure 5:
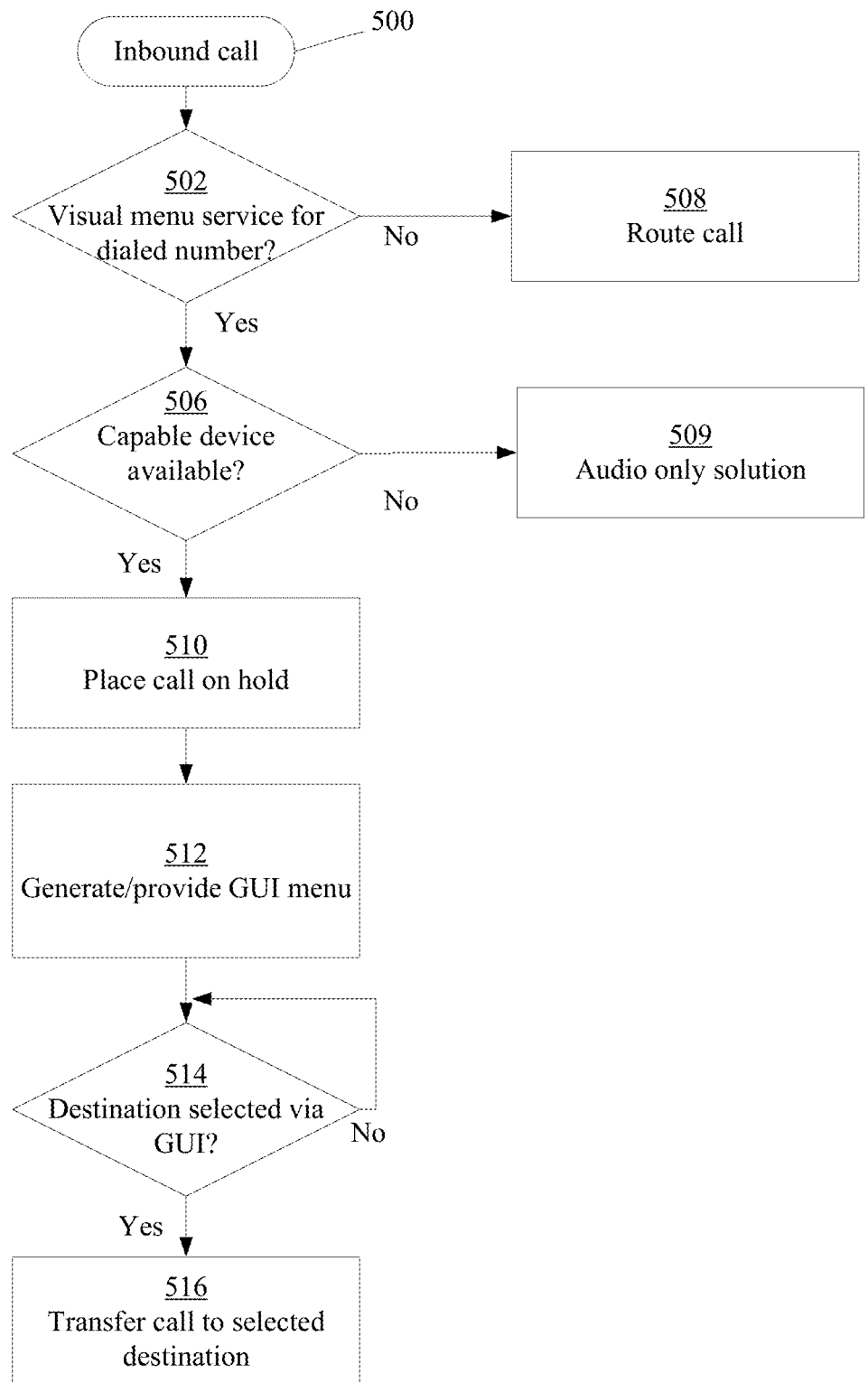
FIG. 5 depicts a flow diagram for use and a generation of a dynamic menu, consistent with embodiments of the present disclosure.

FIG. 5 depicts a flow diagram for use and a generation of a dynamic menu, consistent with embodiments of the present disclosure. An inbound call can be received at an iPBX, per block 500. The iPBX can determine whether or not a dialed number for the inbound call is serviced by an auto attendant and menu service, as shown in block 502. For instance, the iPBX can be configured to handle both direct dial numbers and one or more general numbers. The direct dial numbers can be automatically routed to the corresponding individuals, while the general numbers can be linked to the auto attendant and a corresponding menu tree. If there is no auto attendant, then the call can be transferred or routed to the appropriate party, per block 508.

If there is an auto attendant associated with the called number, then the system can determine whether or not there is an Internet capable device associated with the caller, per block 506. For instance, this might include determining the capabilities of the calling device, or identifying a secondary device, as discussed in more detail herein. If a capable device is not available, the system can be configured to provide an audio only version of the menu, pre block 509.

In certain embodiments, if a capable device is detected a delay can be helpful to establish a link with the capable device and to provide the display data to the capable device. Moreover, extra time can be useful for allowing the system to access call summary metrics, caller profile data, and run analytics on the data. Accordingly, it may be helpful to temporarily place the call on hold, per block 510.

The GUI menu can then be generated and provided to the capable device, per block 512. According to some embodiments, the GUI can be displayed within a web-browser (e.g., Internet Explorer or Chrome). A link can be generated by the system that is specific to the caller. The caller can be provided with this link (e.g., as part of a SMS text message, over an instant message service, as part of a push notification, etc.) and, upon selection of the link by the caller, the menu can be presented by directing a web-browser to a webpage that includes the menu options.

The caller can then use the GUI menu to make selections, provide information, and to traverse the menu tree. If a destination for the call is selected or otherwise indicated, per block 514, the call can then be transferred, as indicated by block 516.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in the figures. Similarly, it will be apparent that a server (e.g., providing a corresponding software platform) includes a computer processing circuit that is configured to provide services to other circuit-based devices. Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method for processing incoming audio calls from audio-capable devices, comprising, at a call processing server:
receiving, at the call processing server, an incoming call from an audio-capable device to a destination number;
associating a caller, using the audio-capable device, with an online identity used to access an online service;
identifying an ancillary source device by querying the online service to identify devices logged in using online identity, wherein each device includes a VoIP-enabled circuit configured for VoIP communications;
detecting availability for the ancillary source device;
providing, to the ancillary source device, a set of data that specifies graphical menu options for functions supported by the call processing server;
receiving, from the ancillary source device, an indication of a selection of one of the graphical menu options and of a particular device to call; and
implementing, in response to the indication, a call transfer for the incoming call by initiating communications for connecting to the ancillary source device and to the particular device to call.

2. The method of claim 1, further comprising:
receiving a second incoming call from a second audio-capable device to the destination number; and
routing, in response to detecting absence of a second ancillary source device linked to a second source device, the second incoming call from the second audio-capable device to an audio call menu interface.

3. The method of claim 1, further comprising, in response to determining that the ancillary source device is Internet capable, placing the incoming call on hold.

4. The method of claim 1, wherein an application is configured and arranged to display the graphical menu in response to receiving the set of data.

5. The method of claim 1, wherein further comprising, for at least one of the graphical menu options and in response to receiving an indication of the at least one of the graphical menu options, providing a second set of data specifying a second graphical menu to an application.

6. The method of claim 1, wherein the indication specifies a particular device to call and selection of the ancillary source device for audio purposes, and wherein the implementing, in response to the indication, the call transfer for the incoming call includes creating call legs configured for calling the ancillary source device and calling the particular device.

7. The method of claim 6, wherein implementing the call transfer further includes connecting a call leg for the ancillary source device with a call leg for the particular device.

8. The method of claim 1, further comprising:
creating, based upon call summary metrics, a probabilistic distribution indicating a probability of selecting various graphical menu options during the incoming call; and
modifying graphical menu options relative to a default menu based upon the probabilistic distribution.

9. The method of claim 8, further comprising identifying, based upon the call summary metrics, predictive information about needs of a particular caller and wherein the set of data includes informational data, other than selectable menu options, that corresponds to the predictive information.

10. The method of claim 8, wherein the call summary metrics include past call history data that indicates previously selected options for a particular caller and wherein the graphical menu options are modified to include bypass menu options that allow the particular caller to bypass previously selected menu options.

11. The method of claim 1, further comprising:
identifying, in response to the selection of menu options, predictive information about needs of a particular caller; and
providing, to the particular caller, displayable informational data, other than selectable menu options, that corresponds to the predictive information.

12. The method of claim 1, further including:
sending, to a call data processing server, call event messages corresponding to phone calls routed by the call processing server;
receiving, from the call data processing server, call summary metrics generated from the call event messages; and
modifying, in response to the call summary metrics, a set of data that corresponds to graphical menu options for functions supported by the call processing server.

13. The method of claim 1, further including detecting availability for an ancillary source device linked to an audio-capable device that has caused an incoming call to occur from the audio-capable device to the destination number, and to be received at the call processing server.

14. A system comprising: a call processing server including at least one processing circuit and a memory circuit that are configured to:
receive, at the call processing server, an incoming call from an audio-capable device to a destination number;
associate a caller, using the audio-capable device, with an online identity used to access an online service;
identify an ancillary source device by querying the online service to identify devices logged in using online identity, wherein each device includes a VoIP-enabled circuit configured for VoIP communications;
detect availability for the ancillary source device;
provide, to the ancillary source device, a set of data that specifies graphical menu options for functions supported by the call processing server;
receive, from the ancillary source device, an indication of a selection of one of the graphical menu options and of a particular device to call; and
implement, in response to the indication, a call transfer for the incoming call by initiating communications for connecting to the ancillary source device and to the particular device to call.

15. The system of claim 14, wherein the system is further configured to:
receive a second incoming call from a second audio-capable device to the destination number; and
route, in response to detecting absence of a second ancillary source device linked to a second source device, the second incoming call from the second audio-capable device to an audio call menu interface.

* * * * *